(12) United States Patent
Okada et al.

(10) Patent No.: US 10,668,979 B2
(45) Date of Patent: Jun. 2, 2020

(54) AIR INTAKE STRUCTURE FOR SADDLED VEHICLE

(71) Applicant: Honda Motor Co., Ltd., Tokyo (JP)

(72) Inventors: Hiromasa Okada, Kumamoto (JP); Daiki Hamaguchi, Kumamoto (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/272,702

(22) Filed: Feb. 11, 2019

(65) Prior Publication Data

US 2019/0300107 A1 Oct. 3, 2019

(30) Foreign Application Priority Data

Mar. 28, 2018 (JP) .................................. 2018-062919

(51) Int. Cl.
*B62M 7/02* (2006.01)
*B62K 19/48* (2006.01)
*F02M 35/10* (2006.01)
*F02M 35/16* (2006.01)

(52) U.S. Cl.
CPC ............... *B62M 7/02* (2013.01); *B62K 19/48* (2013.01); *F02M 35/10098* (2013.01); *F02M 35/10124* (2013.01); *F02M 35/162* (2013.01)

(58) Field of Classification Search
CPC ........... B62M 7/02; B62M 7/06; B62K 19/48; F02M 35/10098; F02M 35/10124; F02M 35/162
USPC ...................................... 180/68.1, 68.2, 68.3
See application file for complete search history.

(56) References Cited

U.S. PATENT DOCUMENTS

| 4,321,978 | A | * | 3/1982 | Tominaga | ............... | B62K 11/04 |
| | | | | | | 123/54.4 |
| 4,597,466 | A | * | 7/1986 | Yamada | .................... | B62J 17/00 |
| | | | | | | 180/215 |
| 5,152,365 | A | * | 10/1992 | Aoshima | ................ | B60K 13/02 |
| | | | | | | 123/198 E |
| 7,325,639 | B2 | * | 2/2008 | Yamaguchi | ............... | B62J 15/00 |
| | | | | | | 180/219 |
| 8,881,859 | B2 | * | 11/2014 | Nakamura | ............... | B62J 17/02 |
| | | | | | | 180/229 |
| 9,815,503 | B2 | * | 11/2017 | Tsukui | .................... | B60K 11/08 |

FOREIGN PATENT DOCUMENTS

JP 60-145932 A 8/1985

* cited by examiner

*Primary Examiner* — John D Walters
(74) *Attorney, Agent, or Firm* — Birch, Stewart, Kolasch & Birch, LLP

(57) ABSTRACT

An air intake structure for a saddled vehicle including a downsized air cleaner box and a sufficient intake path is provided.

An air intake structure for a saddled vehicle applied to a saddled vehicle including an engine suspended from a vehicle body frame and an air cleaner box disposed behind the engine includes: a side cover mounted on a sidewall on an outer side in the vehicle width direction of the air cleaner box; and a side cover opening formed at the side cover toward the vehicle rear side. Outside air to be taken into the air cleaner box is taken from the side cover opening. The sidewall is provided with an intake opening, and the intake opening is covered with the side cover. The side cover includes a body that covers the sidewall, and a canopy member provided at the surface of the body. The side cover opening is formed of the outer edge of the canopy member.

14 Claims, 11 Drawing Sheets

AIR INTAKE STRUCTURE FOR SADDLED VEHICLE

BACKGROUND

1. Technical Field

The present invention relates to an air intake structure for a saddled vehicle, particularly, to an air intake structure for a saddled vehicle in which an air cleaner box is disposed behind an engine.

2. Description of the Background

There is a known conventional structure in which an air cleaner box is disposed behind an engine suspended from a vehicle body frame of a saddled vehicle. From an intake opening provided to the air cleaner box, the outside air is taken in.

Patent Literature 1 discloses a structure of a motorcycle including a seat frame extending vehicle rearward from the rear part of a vehicle body frame from which an engine is suspended. In the structure, an air cleaner box is disposed in the space defined by the vehicle body frame and the seat frame.

CITATION LIST

Patent Literature

Patent Literature 1: Japanese Patent Application Publication No. 60-145932

BRIEF SUMMARY

In the technique disclosed in Patent Literature 1, an intake opening of the air cleaner box is provided on the vehicle rear side. Further, in order to secure the capacity on the dirty side, i.e., the upstream side relative to an air filter, an intake path is provided in a folded manner. This increases the size of the air cleaner box on the vehicle rear side, and can possibly influence the layout of other components.

An object of the present invention is to solve the problem of the conventional technique, and to provide an air intake structure for a saddled vehicle including a downsized air cleaner box and a sufficient intake path.

In order to achieve the object, the present invention according to a first aspect provides an air intake structure for a saddled vehicle applied to a saddled vehicle (1) including an engine (E) suspended from a vehicle body frame (F) and an air cleaner box (80) disposed behind the engine (E), including: a side cover (70) as an exterior component mounted on a sidewall (85) on an outer side in a vehicle width direction of the air cleaner box (80); and a side cover opening (72) formed at the side cover (70) toward a vehicle rear side. Outside air (W) to be taken into the air cleaner box (80) is taken from the side cover opening (72).

In the second aspect of the present invention, the sidewall (85) is provided with an intake opening (82) for the air cleaner box (80), and the intake opening (82) is covered with the side cover (70).

In the third aspect of the present invention, the side cover (70) includes a body (75) covering the sidewall (85) of the air cleaner box (80), and a canopy member (71) provided at a surface of the body (75), a through hole (73) is formed at a vehicle frontward position in the body (75), the canopy member (71) rises on the vehicle front side relative to the through hole (73) and extends vehicle rearward, and the side cover opening (72) is formed by a rear edge of the canopy member (71).

In the fourth aspect of the present invention, as seen in a vehicle side view, a position of the intake opening (82) and a position of the side cover opening (72) overlap each other, and the through hole (73) is disposed on a vehicle front side relative to the intake opening (82) and the side cover opening (72).

In the fifth aspect of the present invention, the intake opening (82) is formed by an end on the outer side in the vehicle width direction of an intake duct (84) disposed to penetrate through the sidewall (85) while being oriented in the vehicle width direction.

In the sixth aspect of the present invention, at the body (75) of the side cover (70), a recess (70a) recessed inward in the vehicle width direction is formed on the vehicle rear side relative to the side cover opening (72).

In the seventh aspect of the present invention, the side cover (70) is disposed below a fuel tank (2) and a seat (24) of the saddled vehicle (1) as seen in the vehicle side view, and the body (75) of the side cover (70) has a curved shape in which its surface on the vehicle rear side is positioned on an inner side in the vehicle width direction relative to its surface on the vehicle front side as seen in a vehicle plan view.

According to the first aspect, an air intake structure for a saddled vehicle applied to a saddled vehicle (1) including an engine (E) suspended from a vehicle body frame (F) and an air cleaner box (80) disposed behind the engine (E) includes: a side cover (70) as an exterior component mounted on a sidewall (85) on an outer side in a vehicle width direction of the air cleaner box (80); and a side cover opening (72) formed at the side cover (70) toward a vehicle rear side. Outside air (W) to be taken into the air cleaner box (80) is taken from the side cover opening (72). Therefore, the space defined between the sidewall of the air cleaner box and the side cover is allowed to function as the dirty side space, i.e., the space upstream to the air filter, contributing to downsizing the air cleaner box. Further, the side cover opening formed at the side cover being oriented toward the vehicle rear side prevents wind from influencing the flow of intake air as the motorcycle travels.

According to the second aspect, the sidewall (85) is provided with an intake opening (82) for the air cleaner box (80), and the intake opening (82) is covered with the side cover (70). Thus, the intake opening of the air cleaner box communicates with the space defined between the sidewall of the air cleaner box and the side cover, and the outside air taken in from the side cover opening is smoothly guided to the intake opening. Further, as compared to the structure in which the intake opening is formed at the rear part of the air cleaner box, the rear part of the air cleaner box is downsized.

According to the third aspect, the side cover (70) includes a body (75) covering the sidewall (85) of the air cleaner box (80), and a canopy member (71) provided at a surface of the body (75), a through hole (73) is formed at a vehicle frontward position in the body (75), the canopy member (71) rises on the vehicle front side relative to the through hole (73) and extends vehicle rearward, and the side cover opening (72) is formed by a rear edge of the canopy member (71). Thus, the canopy member forms an intake path from the side cover opening positioned on the vehicle rear side to the through hole positioned on the vehicle front side. This structure increases the capacity on the downstream side relative to the air filter, thereby enhancing the inertial intake effect and stabilizing the intake pressure.

According to the fourth aspect, as seen in a vehicle side view, a position of the intake opening (82) and a position of the side cover opening (72) overlap each other, and the through hole (73) is disposed on a vehicle front side relative to the intake opening (82) and the side cover opening (72). Thus, the intake path from the side cover opening to the intake opening increases, and the capacity on the downstream side relative to the air filter increases.

According to the fifth aspect, the intake opening (82) is formed by an end on the outer side in the vehicle width direction of an intake duct (84) disposed to penetrate through the sidewall (85) while being oriented in the vehicle width direction. Thus, the intake duct forms the intake path also inside the air cleaner box, thereby stabilizing the flow of the intake air.

According to the sixth aspect, at the body (75) of the side cover (70), a recess (70a) recessed inward in the vehicle width direction is formed on the vehicle rear side relative to the side cover opening (72). Thus, no projections or the like that inhibit intake of the air exist on the rear side relative to the side cover opening. Hence, the intake of air is smoothly performed.

According to the seventh aspect, the side cover (70) is disposed below a fuel tank (2) and a seat (24) of the saddled vehicle (1) as seen in the vehicle side view, and the body (75) of the side cover (70) has a curved shape in which its surface on the vehicle rear side is positioned on an inner side in the vehicle width direction relative to its surface on the vehicle front side as seen in a vehicle plan view. That is, the reduced volume in the vehicle width direction of the vehicle front side of the side cover, which tends to be brought into contact with the rider's leg when the rider seated on the seat steps on the ground, improves ground reachability of the saddled vehicle. Further, by virtue of this structure allowing the rider's leg to be positioned on the front side relative to the side cover opening, intake of the air becomes less prone to be influenced by wind as the saddled vehicle travels.

DETAILED DESCRIPTION

Figure 1:
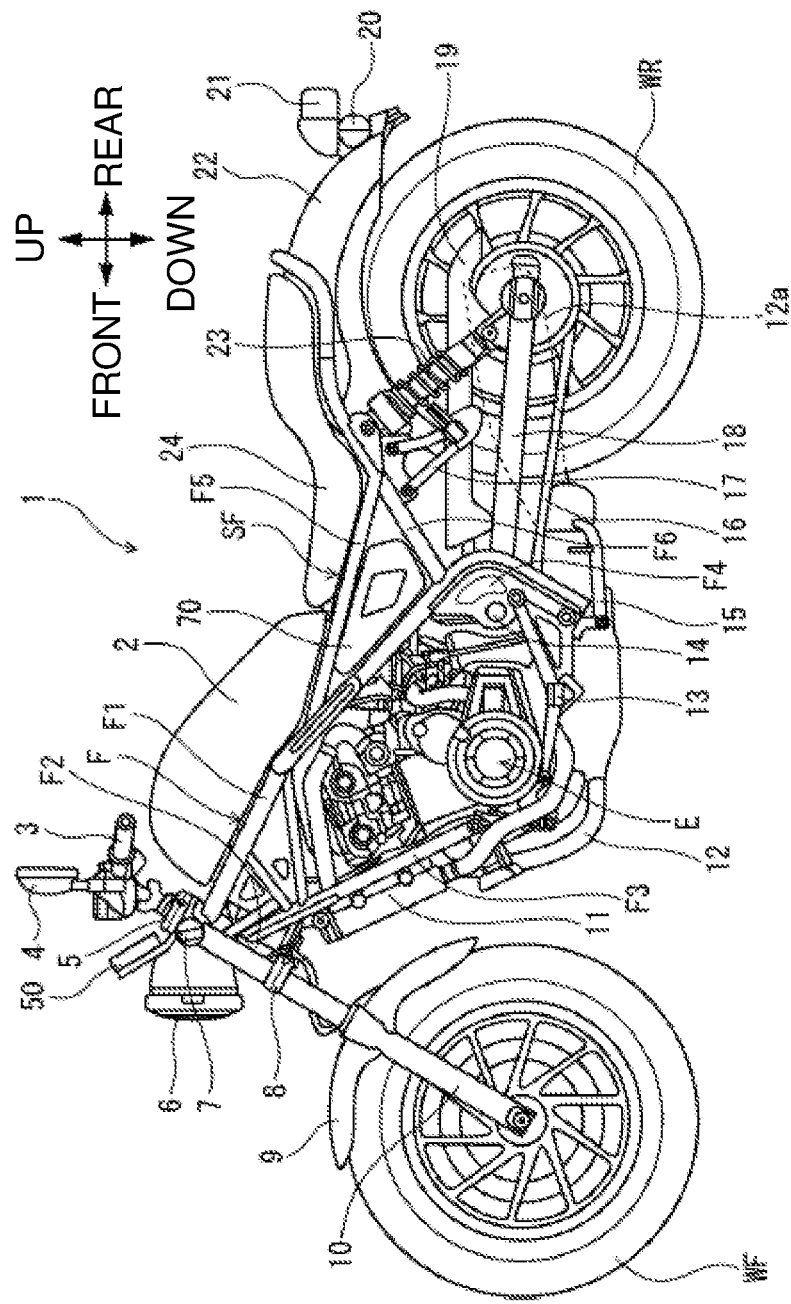
FIG. 1 is a left side view of a motorcycle to which an air intake structure for a saddled vehicle according to one embodiment of the present invention is applied.

In the following, with reference to the drawings, a detailed description will be given of a preferred embodiment of the present invention. FIG. 1 is a left side view of a motorcycle 1 to which an air intake structure for a saddled vehicle according to one embodiment is applied. A vehicle body frame F of the motorcycle 1 includes a right and left pair of main frames F1 extending vehicle rearward and downward from a head pipe F2, a right and left pair of hanger frames F3 extending vehicle rearward and downward from the head pipe F2 below the main frames F1, and a right and left pair of pivot frames F4 coupled to the rear lower part of the main frames F1. To the rear part of the main frames F1, a seat frame SF is coupled. The seat frame SF includes a right and left pair of upper pipes F5 and lower pipes F6 and extends rearward and upward.

An engine E is supported between the main frames F1 and the hanger frames F3. A radiator 11 is disposed in front of the hanger frames F3. Gas burned in the engine E is discharged from a muffler 12a on the right side in the vehicle width direction via an exhaust pipe 12. At the lower end of one pivot frame F4 on the left side in the vehicle width direction, a side stand 15 is swingably supported. On the front side relative to the side stand 15, a right and left pair of foot steps 13 is mounted.

The pivot frames F4 support a pivot 14 that swingably supports the front end of the swingarm 18. The drive power of the engine E is transferred, via a drive chain 16, to a rear wheel WR rotatably supported by the rear end of the swingarm 18. Above the swingarm 18, a chain cover 19 covering the drive chain 16 from above is mounted. The swingarm 18 has its rear part suspended from the seat frame SF by a right and left pair of rear cushions 23. To the lower pipes F6 in front of the rear cushions 23, a right and left pair of pillion step holders 17 is mounted.

A right and left pair of front forks 10 rotatably supporting a front wheel WF is supported by a top bridge 5 and a bottom bridge 8 respectively above and below the head pipe F2. A stem shaft (not shown) vertically coupling the top bridge 5 and the bottom bridge 8 is supported rotatably relative to the head pipe F2. To the upper part of the top bridge 5, a steering handle 3 extending in the vehicle width direction is fixed. To the steering handle 3, a rear view mirror 4 is mounted. An indicator device 50 is supported by the top bridge 5, and a headlight 6 is supported by the bottom bridge 8. A right and left pair of front turn signal devices 7 is supported by the front forks 10 below the top bridge 5.

At the upper part of the main frames F1, a fuel tank 2 is supported. Behind the fuel tank 2, a seat 24 is disposed. At the position below the seat 24 and surrounded by one main frame F1, one upper pipe F5, and one lower pipe F6, a side cover 70 is disposed. To a rear fender 22 disposed behind the seat 24, a tail lamp device 21 and a right and left pair of rear turn signal devices 20 are mounted.

Figure 2:
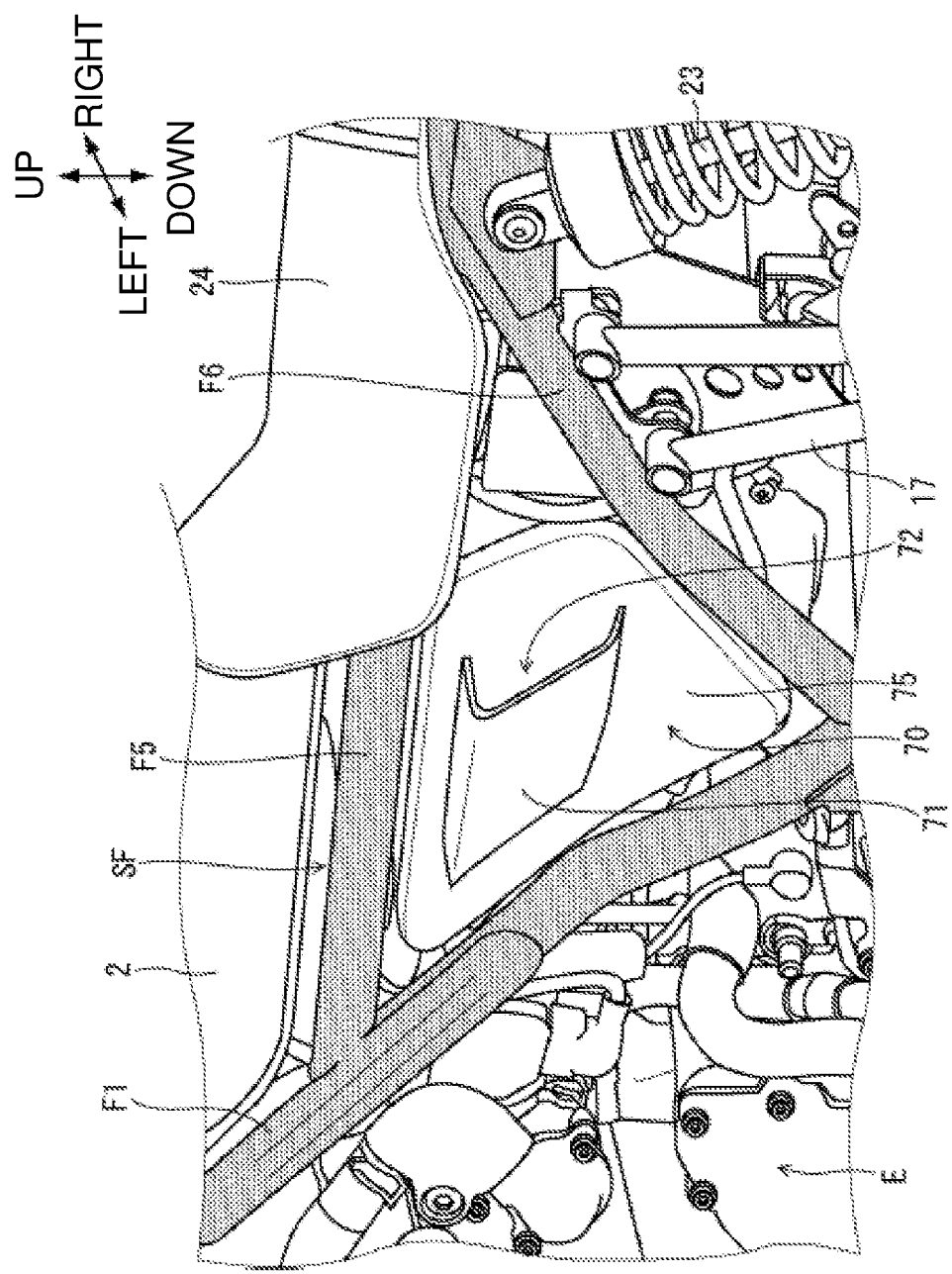
FIG. 2 is a partial enlarged perspective view of the motorcycle.

FIG. 2 is a partial enlarged perspective view of the motorcycle 1. The side cover 70 on the left side in the vehicle width direction includes a body 75 formed of a thin plate of synthetic resin or the like, and a canopy member 71 rising from the surface of the body 75. The side cover 70 is provided with a side cover opening 72 formed by the rear edge of the substantially U-shaped canopy member 71 and the surface of the body 75. The side cover opening 72 functions as the inlet for taking the outside air into an air cleaner box 80 which will be described later.

The side cover opening 72 is provided at the side cover 70 on the left side in the vehicle width direction. Therefore, when the rider parks the motorcycle 1 using the side stand 15 disposed on the left side in the vehicle width direction, entry of rain and the like into the side cover opening 72 becomes less likely to occur.

Figure 3:
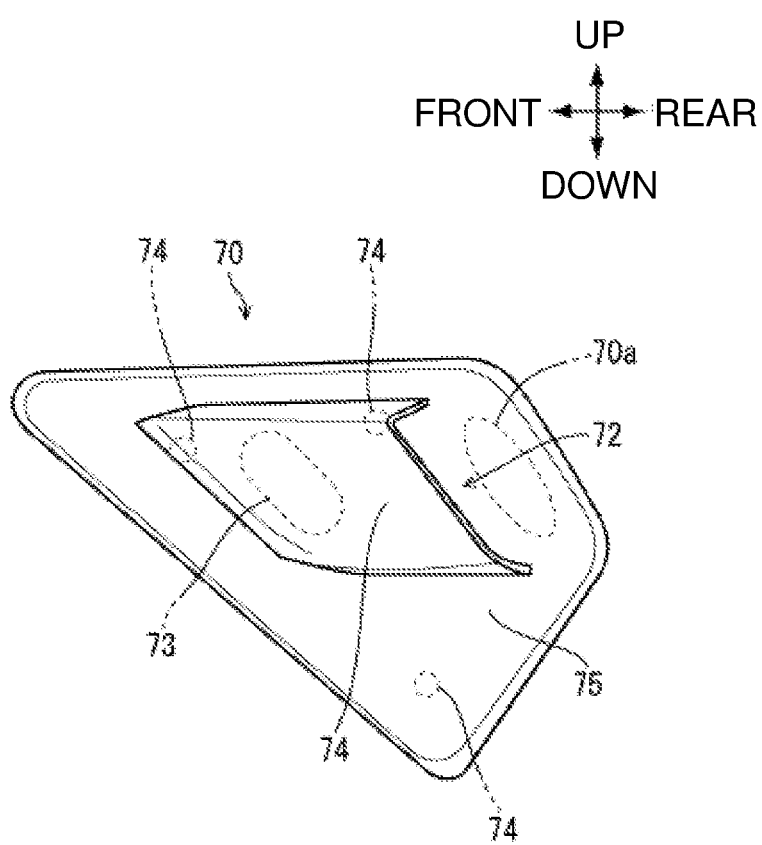
FIG. 3 is a left side view of a side cover.
Figure 4:
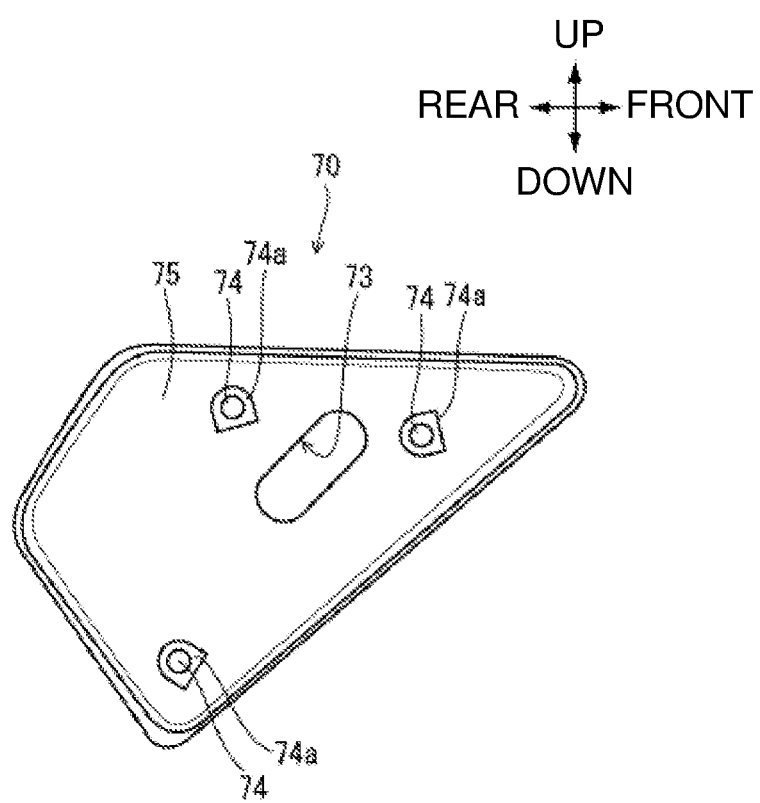
FIG. 4 is a right side view of the side cover.
Figure 5:
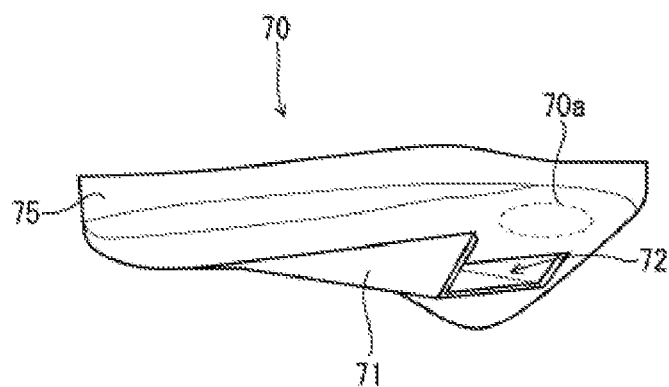
FIG. 5 is a plan view of the side cover.
Figure 6:
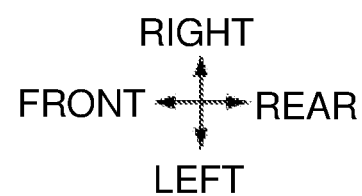
FIG. 6 is a bottom view of the side cover.
Figure 6:
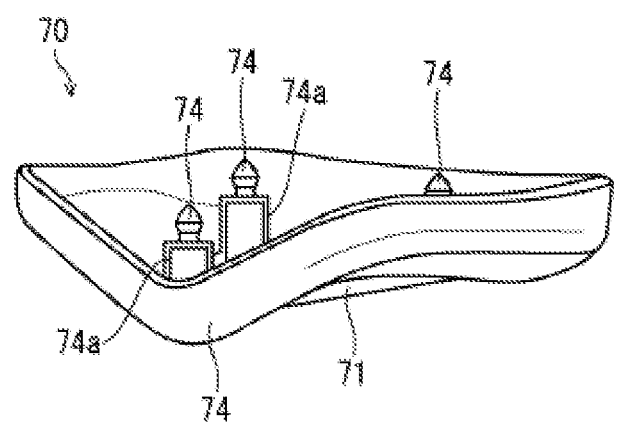
Figure 7:
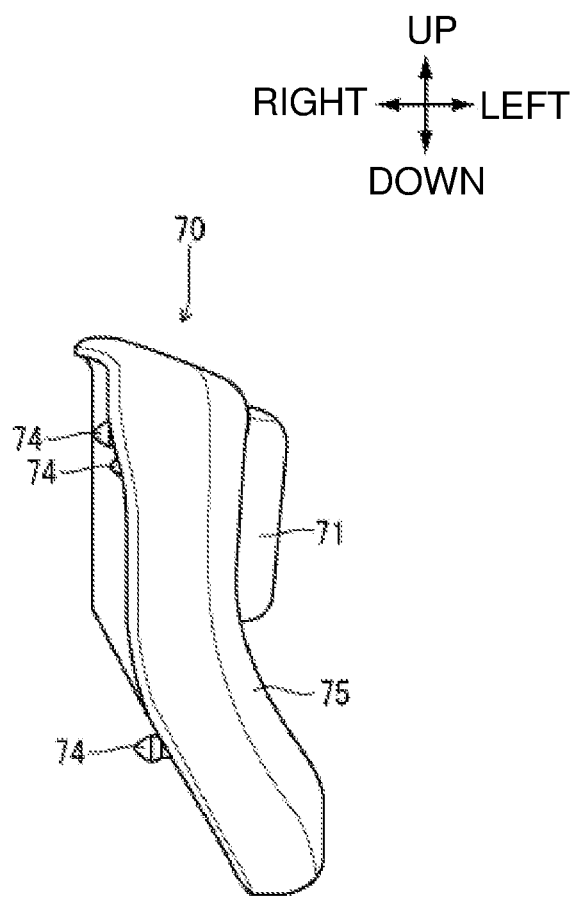
FIG. 7 is a front view of the side cover.

FIG. 3 is a left side view of the side cover 70. FIG. 4 is a right side view of the side cover 70. FIG. 5 is a plan view of the side cover 70. FIG. 6 is a bottom view of the side cover 70. FIG. 7 is a front view of the side cover 70. The body 75 of the side cover 70 as an exterior component is substantially trapezoidal as seen in a side view. The body 75 is provided with an oval through hole 73 at a vehicle frontward position in a range covered by the canopy member 71. On the back surface side of the side cover 70, three engaging projections 74 for fixing the side cover 70 to the sidewall of the air cleaner box 80 (see FIG. 9) are provided. The engaging projections 74 are supported by bosses 74a rising from the back surface side of the body 75.

With reference to FIG. 7, the body 75 has a curved shape in which the vehicle lower side is positioned on the outer side in the vehicle width direction relative to the vehicle upper side. The canopy member 71 is disposed at the vehicle upper position in the body 75, so that the canopy member 71 projecting in the left side in the vehicle width direction is unobtrusive.

As shown in FIGS. 3 and 5, a recess 70a recessed inward in the vehicle width direction is formed at the vehicle rearward position relative to the side cover opening 72. Thus, no projections or the like that inhibit intake of the air exist on the rear side relative to the side cover opening 72. Hence, the outside air is smoothly taken into the side cover opening 72.

Figure 8:
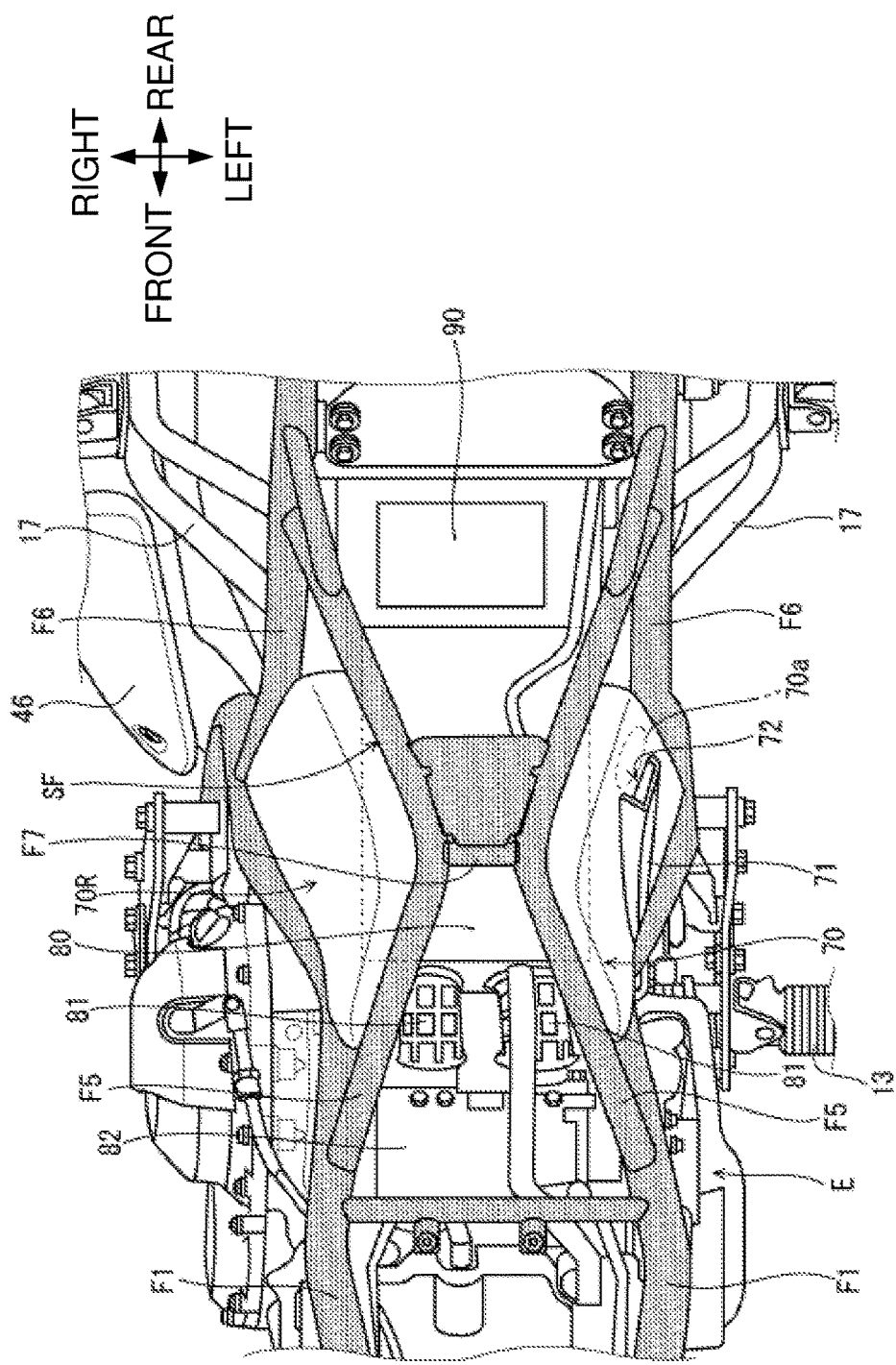
FIG. 8 is a plan view of the motorcycle from which a fuel tank and a seat are removed.

FIG. 8 is a plan view of the motorcycle 1 from which the fuel tank 2 and the seat 24 are removed. The air cleaner box 80 is disposed at the center in the vehicle width direction behind the engine E. Between the air cleaner box 80 and the engine E, a throttle body 82 connected to an intake port, and a right and left pair of intake pipes 81 that send the outside air filtered by the air cleaner box 80 to the throttle body 82 are disposed. Behind the air cleaner box 80, a battery 90 is disposed.

The side cover 70 is directly mounted on the sidewall of the air cleaner box 80 on the left side in the vehicle width direction. On the other hand, on the right side in the vehicle width direction of the air cleaner box 80, a right side cover 70R which do not include the canopy member 71 and the through hole 73 is mounted. The right and left pair of main frames F1 is coupled to the pivot frames F4 while increasing the distance in the vehicle width direction between the pair toward the vehicle rear side from the positions corresponding to the outer side in the vehicle width direction relative to the intake pipes 81.

On the other hand, the right and left upper pipes F5 structuring the seat frame SF reduce the distance between them in the vehicle width direction toward the vehicle rear side. On the rear side relative to the cross pipe F7 coupling between the right and left upper pipes F5, the upper pipes F5 gradually increase the distance between them in the vehicle width direction, and connected to the lower pipes F6. The side cover 70 and the right side cover 70R each have a curved shape so as to cover the space defined by the corresponding main frame F1, the corresponding upper pipe F5, and the corresponding lower pipe F6.

In the side cover 70 having such a shape, the body 75 has the curved shape in which the surface on the vehicle front side is positioned on the inner side in the vehicle width direction relative to the surface on the vehicle rear side as seen in a vehicle plan view. That is, the reduced volume of the vehicle front side of the side cover 70, which tends to be brought into contact with the rider's leg when the rider seated on the seat 24 steps on the ground, improves the ground reachability of the motorcycle 1. Further, by virtue of this structure allowing the rider's leg to be positioned on the front side relative to the side cover opening 72, the rider's leg blocks wind from blowing around the side cover opening 72 as the motorcycle 1 travels, realizing smooth intake of the air.

Figure 9:
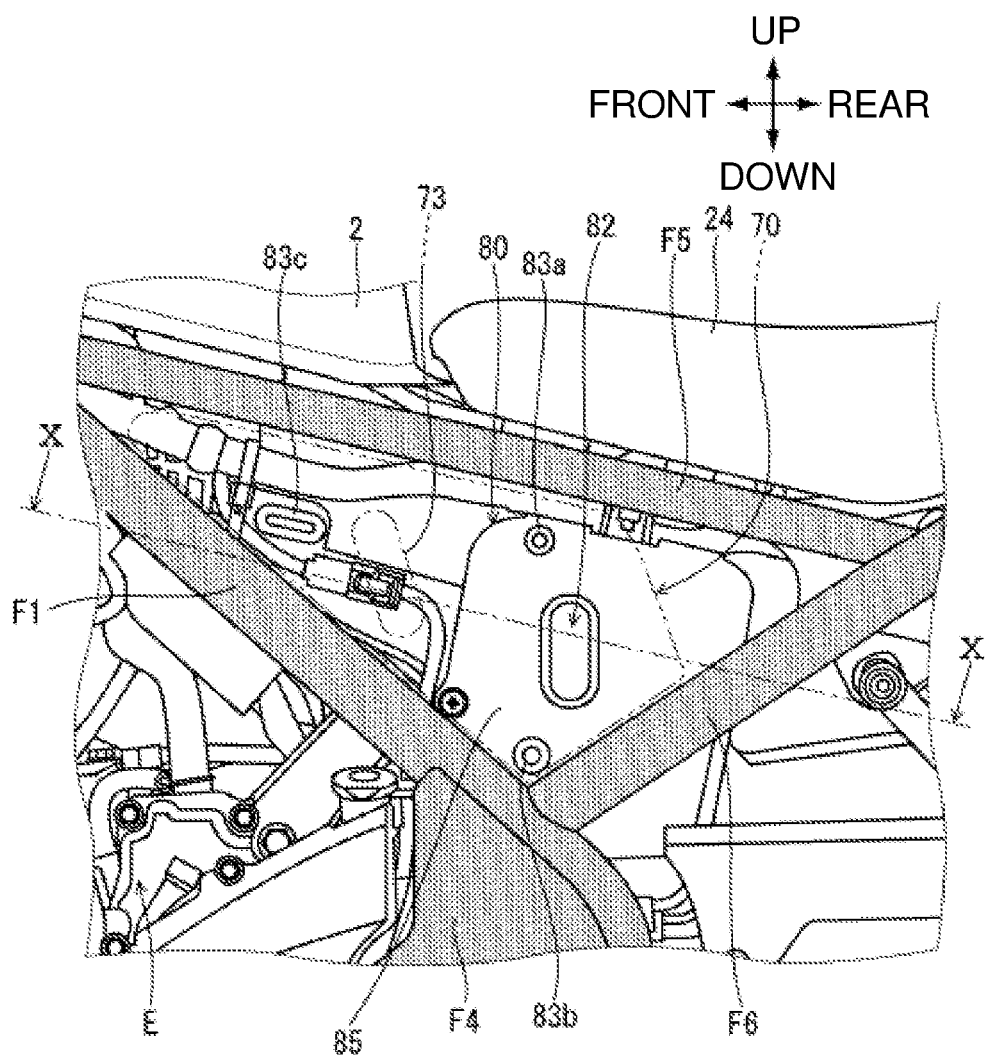
FIG. 9 is a partial enlarged left side view of the motorcycle from which the side cover is removed.

FIG. 9 is a partial enlarged left side view of the motorcycle 1 from which the side cover 70 is removed. The side cover 70 is mounted on a sidewall 85, on the left side in the vehicle width direction, of the air cleaner box 80, which sidewall 85 is formed of thin-plate like synthetic resin. The sidewall 85 is provided with grommets 83a, 83b, 83c into which the engaging projections 74 at the side cover 70 are inserted. The sidewall 85 is provided with an intake opening 82 for taking in the outside air to the air cleaner box 80.

The through hole 73 provided to the side cover 70 is positioned on the vehicle front side relative to the intake opening 82 of the sidewall 85. That is, between the side cover opening and the intake opening 82, the side cover 70 forms an intake path. The outside air taken in from the side cover opening 72 flows vehicle frontward and passes through the through hole 73; thereafter flows vehicle rearward and taken into the intake opening 82. Here, by virtue of the side cover 70 being directly fixed to the sidewall 85, the alignment of the side cover 70 improves, minimizing any variations in precision of the intake path.

Further, by virtue of the side cover 70 forming the intake path, provided that the side cover opening 72 is splashed with water because of the motorcycle 1 driving through a puddle or being washed, the risk of entry of the water from the intake opening 82 of the air cleaner box 80 is minimized. Still further, by virtue of the side cover opening 72 communicating with the intake opening 82 being formed at the side cover 70 immediately below the seat 24, the acoustic effect of positively providing the rider with the intake sound is exhibited.

Figure 10:
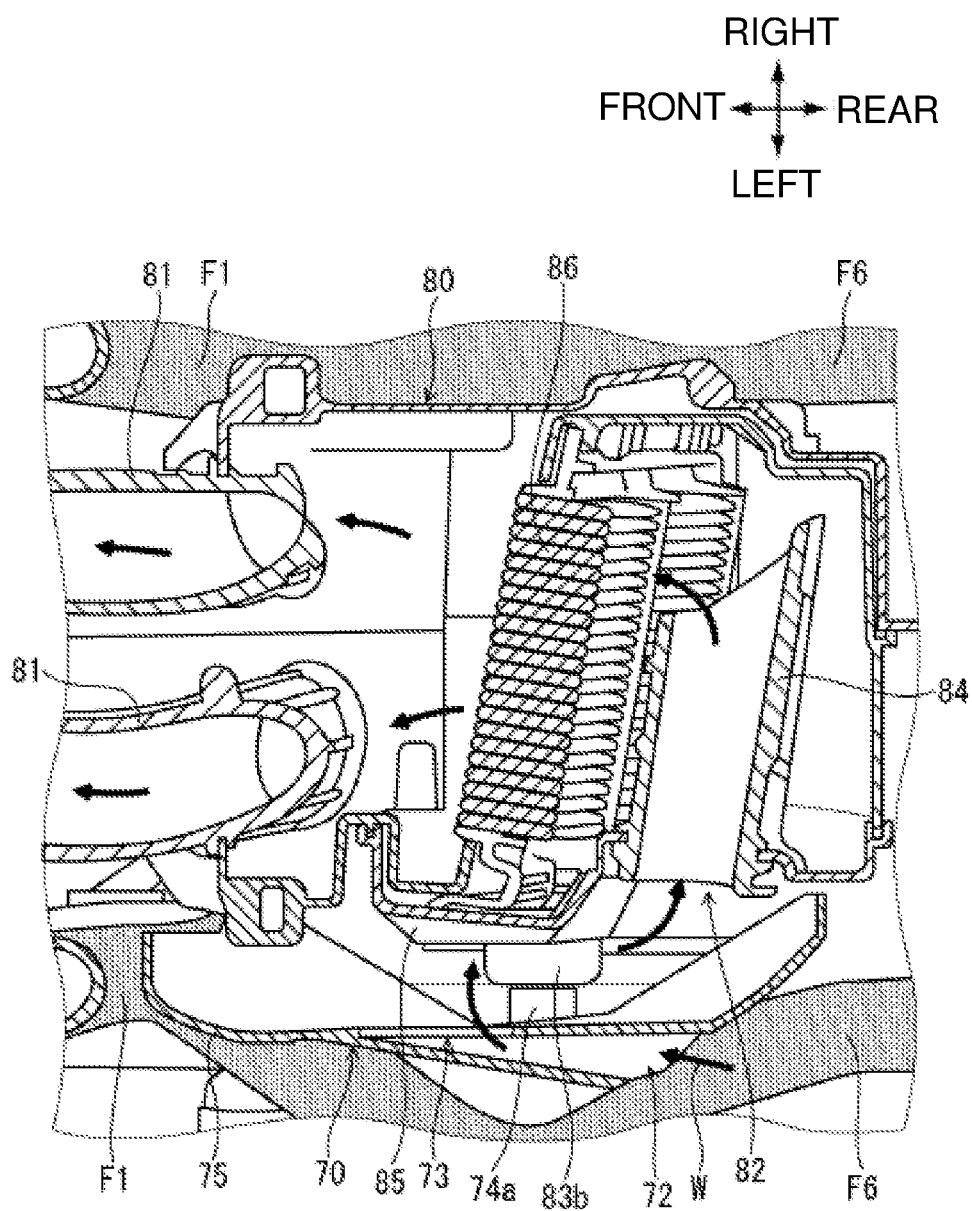
FIG. 10 is a cross-sectional view taken along line X-X in FIG. 9.
Figure 11:
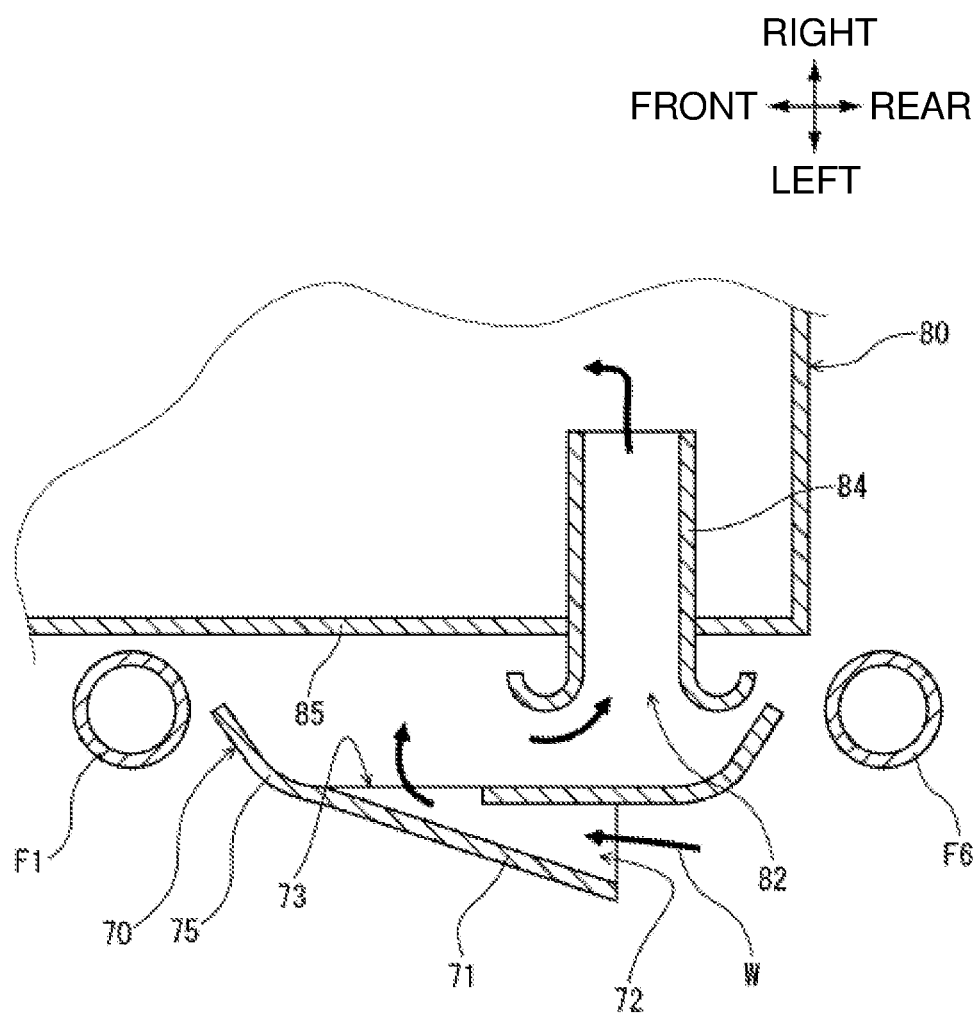
FIG. 11 is a schematic cross-sectional view corresponding to FIG. 10.

FIG. 10 is a cross-sectional view taken along line X-X in FIG. 9. FIG. 11 is a schematic cross-sectional view corresponding to FIG. 10. The air intake structure according to the present embodiment is characterized in taking in outside air W to be guided to the intake opening 82 of the air cleaner box 80 from the side cover opening 72 provided at the side cover 70. The outside air W taken in from the side cover opening 72 flows toward the vehicle rear side through the through hole 73 on the vehicle front side, and is taken in from the intake opening 82.

The outside air taken in from the intake opening 82 is guided toward the right side in the vehicle width direction by a pipe-like intake duct 84 made of rubber, and sent to the right and left pair of intake pipes 81 through a dry or wet air filter 86. The intake opening 82 of the air cleaner box 80 is formed by the end, on the left side in the vehicle width direction, of the intake duct 84 installed inside the air cleaner box 80.

Thus, the space defined between the sidewall 85 of the air cleaner box 80 and the side cover 70 is allowed to function as the dirty side space, i.e., the space upstream to the air filter 86, contributing to downsizing the air cleaner box 80. Further, the side cover opening 72 formed at the side cover 70 being oriented toward the vehicle rear side prevents wind from influencing the flow of intake air as the motorcycle 1 travels.

Further, the intake opening 82 is provided at the sidewall 85 of the air cleaner box 80 and the intake opening 82 is covered with the side cover 70. Thus, the intake opening 82 communicates with the space defined between the sidewall 85 and the side cover 70, and the outside air taken in from the side cover opening 72 of the side cover 70 is smoothly guided to the intake opening 82. Then, as compared to the structure in which the intake opening is formed at the rear part of the air cleaner box 80, the rear part of the air cleaner box 80 is downsized.

Still further, the canopy member 71 rising on the vehicle front side relative to the through hole 73 and extending vehicle rearward is provided at the body 75 of the side cover 70, and the side cover opening 72 is formed by the rear edge of the canopy member 71. Thus, the intake path is formed from the side cover opening 72 positioned on the vehicle rear side to the through hole 73 positioned on the vehicle front side. This structure increases the capacity on the downstream side relative to the air filter 86, thereby enhancing the inertial intake effect and stabilizing the intake pressure.

Still further, as seen in a side vehicle view, the position of the intake opening 82 and the position of the side cover opening 72 overlap each other, and the through hole 73 is disposed on the vehicle front side relative to the intake opening 82 and the side cover opening 72. Thus, the intake path from the side cover opening 72 to the intake opening 82 of the air cleaner box 80 increases, and the capacity on the downstream side relative to the air filter 86 increases.

Still further, the intake opening 82 of the air cleaner box 80 is oriented in the vehicle width direction, and formed by the end, on outer side in the vehicle width direction, of the intake duct 84 disposed to penetrate through the sidewall 85. Thus, the intake duct 84 forms the intake path also inside the air cleaner box 80, thereby stabilizing the flow of the intake air.

Note that, the type of the saddled vehicle, the shape and structure of the vehicle body frame, the shape and structure of the air cleaner box, the shape of the side cover and the canopy member, the shape and disposition of the side cover opening, the shape and disposition of the intake opening and the through hole are not limited to the embodiment described above, and various modification can be made. The air intake structure of the present invention is not limited to a two-wheel motorcycle, and is applicable to a three- or four-wheel saddled vehicle in which the side cover is mounted on the outer side in the vehicle width direction of the air cleaner box.

REFERENCE SIGNS LIST

1 motorcycle (saddled vehicle)
2 fuel tank
24 seat
70 side cover
70a recess
71 canopy member
72 side cover opening
73 through hole
75 body
80 air cleaner box
81 intake pipe
82 intake opening
84 intake duct
85 sidewall
86 air filter
F vehicle body frame
F1 main frame
F5 upper pipe
F6 lower pipe
E engine

What is claimed is:

1. An air intake structure for a saddled vehicle applied to a saddled vehicle including an engine suspended from a vehicle body frame and an air cleaner box disposed behind the engine, comprising:
   a side cover as an exterior component mounted on a sidewall on an outer side in a vehicle width direction of the air cleaner box; and
   a side cover opening formed at the side cover toward a vehicle rear side,
   wherein outside air to be taken into the air cleaner box is taken from the side cover opening,
   wherein the sidewall is provided with an intake opening for the air cleaner box, and
   wherein the intake opening is covered with the side cover.

2. The air intake structure for a saddled vehicle according to claim 1, wherein the side cover includes a body covering the sidewall of the air cleaner box, and a canopy member provided at a surface of the body,
   wherein a through hole is formed at a vehicle frontward position in the body,
   wherein the canopy member rises on the vehicle front side relative to the through hole and extends vehicle rearward, and
   wherein the side cover opening is formed by a rear edge of the canopy member.

3. The air intake structure for a saddled vehicle according to claim 2, wherein as seen in a vehicle side view, a position of the intake opening and a position of the side cover opening overlap each other, and
   wherein the through hole is disposed on a vehicle front side relative to the intake opening and the side cover opening.

4. The air intake structure for a saddled vehicle according to claim 3, wherein the intake opening is formed by an end on the outer side in the vehicle width direction of an intake duct disposed to penetrate through the sidewall while being oriented in the vehicle width direction.

5. An air intake structure for a saddled vehicle applied to a saddled vehicle including an engine suspended from a vehicle body frame and an air cleaner box disposed behind the engine, comprising:
   a side cover as an exterior component mounted on a sidewall on an outer side in a vehicle width direction of the air cleaner box; and
   a side cover opening formed at the side cover toward a vehicle rear side,
   wherein outside air to be taken into the air cleaner box is taken from the side cover opening,
   wherein the side cover includes a body covering the sidewall of the air cleaner box, and a canopy member provided at a surface of the body,
   wherein a through hole is formed at a vehicle frontward position in the body,
   wherein the canopy member rises on the vehicle front side relative to the through hole and extends vehicle rearward, and
   wherein the side cover opening is formed by a rear edge of the canopy member.

6. The air intake structure for a saddled vehicle according to claim 5, wherein as seen in a vehicle side view, a position of the intake opening and a position of the side cover opening overlap each other, and
   wherein the through hole is disposed on a vehicle front side relative to the intake opening and the side cover opening.

7. The air intake structure for a saddled vehicle according to claim 6, wherein the intake opening is formed by an end on the outer side in the vehicle width direction of an intake duct disposed to penetrate through the sidewall while being oriented in the vehicle width direction.

8. The air intake structure for a saddled vehicle according to claim 7, wherein, at the body of the side cover, a recess recessed inward in the vehicle width direction is formed on the vehicle rear side relative to the side cover opening.

9. The air intake structure for a saddled vehicle according to claim 7, wherein the side cover is disposed below a fuel tank and a seat of the saddled vehicle as seen in the vehicle side view, and wherein the body of the side cover has a curved shape in which its surface on the vehicle rear side is positioned on an inner side in the vehicle width direction relative to its surface on the vehicle front side as seen in a vehicle plan view.

10. The air intake structure for a saddled vehicle according to claim 6, wherein, at the body of the side cover, a recess recessed inward in the vehicle width direction is formed on the vehicle rear side relative to the side cover opening.

11. The air intake structure for a saddled vehicle according to claim 6, wherein the side cover is disposed below a fuel tank and a seat of the saddled vehicle as seen in the vehicle side view, and wherein the body of the side cover has a curved shape in which its surface on the vehicle rear side is positioned on an inner side in the vehicle width direction relative to its surface on the vehicle front side as seen in a vehicle plan view.

12. The air intake structure for a saddled vehicle according to claim 5, wherein, at the body of the side cover, a recess recessed inward in the vehicle width direction is formed on the vehicle rear side relative to the side cover opening.

13. The air intake structure for a saddled vehicle according to claim 12, wherein the side cover is disposed below a fuel tank and a seat of the saddled vehicle as seen in the vehicle side view, and wherein the body of the side cover has a curved shape in which its surface on the vehicle rear side is positioned on an inner side in the vehicle width direction relative to its surface on the vehicle front side as seen in a vehicle plan view.

14. The air intake structure for a saddled vehicle according to claim 5, wherein the side cover is disposed below a fuel tank and a seat of the saddled vehicle as seen in the vehicle side view, and wherein the body of the side cover has a curved shape in which its surface on the vehicle rear side is positioned on an inner side in the vehicle width direction relative to its surface on the vehicle front side as seen in a vehicle plan view.

* * * * *